Patented Oct. 27, 1925.

1,559,507

UNITED STATES PATENT OFFICE.

RANDOLPH LEEDOM, OF CLIFTON, NEW JERSEY, ASSIGNOR TO THE WESTERN UNION TELEGRAPH COMPANY, OF NEW YORK, N. Y., A CORPORATION OF NEW YORK.

PRESERVING GROUND-LINE SECTION OF POLES.

No Drawing.      Application filed May 10, 1924. Serial No. 712,467.

*To all whom it may concern:*

Be it known that I, RANDOLPH LEEDOM, a citizen of the United States, residing at Clifton, in the county of Passaic and State of New Jersey, have invented certain new and useful Improvements in Preserving Ground-Line Sections of Poles, of which the following is a specification.

My invention relates to the preservation of standing poles, such as telegraph and telephone poles, by protecting the base for a distance immediately above and below the ground line. The majority of the poles utilized for telegraph and telephone lines, perhaps 80%, are of various species of cedar and chestnut which ordinarily decay only in the belt adjacent the ground line.

In the application of preservatives to wood, such as coal tar or wood tar derivatives, three general methods have been commonly employed: (1) the pressure method in which the preservative is forced into the wood under high pressure, the wood having been previously prepared by steaming and in some cases by the application of a partial vacuum; (2) the open tank method in which the wood is submerged for a stated period in a hot preservative to expand the air in the cells and afterward subjected to a vacuum and changing to a cold preservative, thereby causing the preservative to be drawn into the cells; and (3) the superficial treatment in which the hot preservative is merely applied to the wood by means of a brush or spray.

The pressure method requires the pole timbers to be treated throughout their entire length. The open tank process and the superficial treatment, on the other hand, are generally employed upon those timbers which require treatment only at the ground line section or belt which lies immediately above and below the ground line.

Both the pressure and open tank methods result in much better penetration and absorption of the preservative medium than the superficial treatments commonly employed. The penetration and the amount of oil absorbed in the pressure treatment is usually dependent on the length of time during which the treatment is applied and upon the pressure employed. The penetration with the open tank method is usually full sap or less, no oil penetrating the heart wood. With the open tank process a considerable length of the pole below the ground line belt is also treated needlessly. The pressure and open tank treatments are, however, more costly than the superficial treatment and necessitate the transportation of all poles to a central location for treatment and then shipping them to the places where they are to be set up in the line.

The main purpose of my invention is to provide a method of treating poles while they are standing in line and at any stage in the life of the pole, thereby avoiding the necessity of shipment to a central point. This method consists essentially in providing an open tank bath for the ground line belt and maintaining a bath of the preservative at this point.

The method which I employ is as follows:—The earth is first excavated from around the base of the pole to a depth of approximately twelve inches. The pole may then be charred and the earth at the bottom of the excavation thoroughly dried by the application of heat, as by the use of a high pressure kerosene burner, which is advantageous but not essential to the process. This preliminary conditioning or charring drives out the air and moisture in the cells, pores and ducts of the wood, opens up the season checks and cracks, destroying any bacterial spores and thoroughly sterilizing the wood. Next a thin sheet metal plate about two feet in length and of sufficient width to surround the pole is bent closely around the pole and the meeting edges are either crimped or soldered to form a tight joint. The metal shield or envelope thus formed is lowered until its bottom edge is about two inches above the bottom of the excavation, thus leaving something more than a foot extending above ground. Molten sulfur is now poured into the excavation until it comes well above the lower edge of the metal casing or jacket to thereby form a tight non-porous bond between the earth, pole and jacket. As soon as the sulphur has solidified a small quantity of melted paraffin or other suitable sealing material is poured into the space within the jacket to close any pin checks and penetrate any deep checks not reached by the sulphur. A liquid preservative, such as creosote oil, is next poured into the annular cavity between the pole and the jacket or casing and after the initial settlement and flow into the pores and checks has taken place, the cavity is refilled to within about three-quarters of an inch of the top of the jacket. This liquid preservative bath is then sealed by pouring melted paraffin or other light wax on top of the oil until the jacket is filled. This seal prevents any evaporation of the oil or splashing out during rain storms. The earth is then refilled around the jacket and pole.

By thus effectually sealing the liquid preservative about the pole, I have found that the oil penetrates through the sap wood and into the heart wood. This penetration takes place either in winter or in summer. The creasote oil can be maintained in contact with the desired pole belt for a period of time depending practically upon the life of the metal shield and casing, thus constituting a perpetual preservative bath. It is confined to the decay belt where it is needed and the amount of oil used per pole is only about one-eighth of that required for the ordinary open tank process.

While other bonding and sealing means may be employed, I have found that sulphur is peculiarly adapted for this purpose.

Sulphur is very fluid when melted and it hardens into a concrete-like non-porous structure which is strong enough to withstand all crushing and breaking action to which it may be subjected by the swaying of the pole in high winds or to the strains due to refilling and tamping the hole. It forms a tenacious oil-proof bond with the metal shield and the wood and does not shrink away or permit any seepage of oil through its structure.

The method above described is in general preferable, yet climatic and other conditions sometimes permit the use of a modification of the method. Thus it may not be necessary to char the pole and instead of the creosote I may fill the annular cavity between the metal shield and the pole with a water-soluble preservative salt, such as zinc chloride or sodium fluoride, either pure or mixed with sand and leave the top of the shield unsealed so that the water which trickles down the pole during rain storms will dissolve some of the preservative salt and thus subject the ground line section of the pole periodically to an antiseptic bath.

I claim:

1. The process of preserving the ground line section or belt of standing wood poles from decay, which comprises forming an annular envelope about the section to be preserved, forming an impervious bond between the lower margin of said envelope and the pole, filling the enclosed space with a liquid preservative and applying an impervious seal to the upper surface of said preservative.

2. The process of preserving the ground line section or belt of standing wood poles from decay, which comprises forming an excavation about the pole for a certain distance below the ground line, charring the pole, encasing a fluid preservative in contact with the pole over an area extending above and below the ground line and refilling the excavation.

3. The process of preserving the ground line section or belt of standing wood poles from decay, which comprises forming an annular envelope about the section to be preserved, forming an impervious bond between the lower margin of said envelope and the pole, and filling the enclosed space with a preservative.

In testimony whereof I affix my signature.

RANDOLPH LEEDOM.